US007733425B2

(12) United States Patent
Kawashima et al.

(10) Patent No.: US 7,733,425 B2
(45) Date of Patent: Jun. 8, 2010

(54) AUTOMATIC PICTURE CONDITIONING BASED UPON USER INPUT CHOOSING A VIDEO LABEL

(75) Inventors: Toshiyuki Kawashima, North Hungtingdon, PA (US); Frank L. Medeiros, Jr., W. Mifflin, PA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2011 days.

(21) Appl. No.: 10/403,825

(22) Filed: Mar. 31, 2003

(65) Prior Publication Data

US 2004/0194132 A1 Sep. 30, 2004

(51) Int. Cl.
*H04N 5/268* (2006.01)
*G06F 3/00* (2006.01)
*H04N 5/50* (2006.01)
*H04N 5/46* (2006.01)
*H04N 7/16* (2006.01)

(52) U.S. Cl. .................. 348/705; 348/569; 348/556; 725/37; 725/153; 715/722

(58) Field of Classification Search .............. 725/37, 725/153; 348/569, 556, 705; 715/722
See application file for complete search history.

(56) References Cited

U.S. PATENT DOCUMENTS

| 4,433,345 | A | * | 2/1984 | Haddick et al. | 386/128 |
| 5,047,867 | A | * | 9/1991 | Strubbe et al. | 386/83 |
| 5,650,827 | A | * | 7/1997 | Tsumori et al. | 725/59 |
| 5,687,334 | A | * | 11/1997 | Davis et al. | 715/764 |
| 5,740,436 | A | * | 4/1998 | Davis et al. | 713/1 |

(Continued)

FOREIGN PATENT DOCUMENTS

JP 09-070000 * 3/1997

(Continued)

OTHER PUBLICATIONS

Review of Sony KP-57HW40 57 in Television, Apr. 2002, http://www.epinions.com/content_62198091396.*

*Primary Examiner*—Hoang-Vu A Nguyen-Ba
(74) *Attorney, Agent, or Firm*—Mayer & Williams PC; Karin L. Williams, Esq.; Stuart H. Mayer, Esq.

(57) ABSTRACT

A method and apparatus for optimizing picture quality of a video signal. The method includes displaying a user menu having a plurality of choices of video labels; receiving a choice of video label from the plurality via an input from a user; translating the video label into a label code; receiving at least a first video processing parameter from a look-up table corresponding to the label code; and configuring a video processor according to the first video processing parameter. The apparatus includes a microprocessor; a memory associated with the microprocessor, the memory for storing video parameters associated with video processing; a video input selector coupled to a plurality of video inputs, the video input selector also coupled to the microprocessor to receive a choice of video inputs therefrom; and a video processor connected to the microprocessor for receiving video parameters therefrom, the video processor also coupled to the video input selector to receive a video signal therefrom and to condition the video signal using the video parameters. The invention may be implemented in software, hardware, firmware, microcode, and other such media.

8 Claims, 3 Drawing Sheets

U.S. PATENT DOCUMENTS

| | | | |
|---|---|---|---|
| 5,896,130 A * | 4/1999 | Tsuchiya et al. | 725/37 |
| 5,990,940 A * | 11/1999 | Hashimoto et al. | 348/184 |
| 6,151,444 A * | 11/2000 | Abecassis | 386/125 |
| 6,529,680 B1 * | 3/2003 | Broberg | 386/83 |
| 6,650,248 B1 * | 11/2003 | O'Donnell et al. | 340/825.69 |
| 6,717,622 B2 * | 4/2004 | Lan | 348/625 |
| 6,753,928 B1 * | 6/2004 | Gospel et al. | 348/569 |
| 6,927,801 B2 * | 8/2005 | Yugami et al. | 348/458 |
| 6,956,496 B1 * | 10/2005 | Herz | 340/825.22 |
| 7,057,673 B1 * | 6/2006 | Weber | 348/734 |
| 7,269,785 B1 * | 9/2007 | Halfant | 715/203 |
| 7,482,944 B2 * | 1/2009 | Bresin | 340/825.57 |
| 2002/0060746 A1 * | 5/2002 | Yugami et al. | 348/458 |
| 2003/0103165 A1 * | 6/2003 | Bullinger et al. | 348/569 |
| 2003/0156073 A1 * | 8/2003 | Van Zon | 345/1.1 |
| 2004/0090556 A1 * | 5/2004 | Kamieniecki et al. | 348/558 |
| 2004/0119893 A1 * | 6/2004 | Burnworth | 348/705 |
| 2005/0210101 A1 * | 9/2005 | Janik | 709/203 |

FOREIGN PATENT DOCUMENTS

| | | | |
|---|---|---|---|
| JP | 11-032288 | * | 2/1999 |
| JP | 2000-100134 | * | 4/2000 |

\* cited by examiner

AUTOMATIC PICTURE CONDITIONING BASED UPON USER INPUT CHOOSING A VIDEO LABEL

CROSS-REFERENCE TO RELATED APPLICATIONS (none)

REFERENCE TO GOVERNMENTAL SUPPORT (none)

REFERENCE TO MICROFICHE APPENDIX (none)

FIELD OF THE INVENTION

The present invention relates to conditioning picture quality in televisions.

BACKGROUND OF THE INVENTION

Current TVs can receive signals from a variety of input types, such as DVD, cable, MPEG, RF, VCD, etc. The signal from each input type has generally different signal characteristics. The TV picture quality of each input type is generally optimized with a different TV input setting, this TV input setting determining how the TV tuner treats the signal.

When a user switches from an input type with an optimized picture quality to a different input type, the picture quality diminishes unless the TV input setting is also changed.

For example, if the input type is a DVD, the TV input setting should be set to a high frequency response. If the input type is switched to cable, the high frequency response TV input setting causes the noise level to be heightened, resulting in a noisy picture quality.

Alternatively, if the input type is cable, the TV input setting should be set to a lower frequency response, or should employ noise reduction techniques. If the input type is then switched to DVD, the lower frequency response TV input setting causes the DVD picture quality to lose detail and become "soft".

The following table summarizes certain of the preferred settings for various signal sources:

|  | Noise | Frequency response |
| --- | --- | --- |
| VCR | High | Low |
| DVD | Low | Mid |
| HD | Low | High |

Current systems employ TV input settings that can be manually changed by the user.

Many users have difficulty operating these systems. In addition, they primarily serve to merely identify which of several physical TV input connectors should be used as a signal source. As such, no special signal conditioning is employed.

Various methods have been developed that enable the system to change the input setting based on certain detected signal characteristics, such as signal strength. These methods are generally cumbersome and fail to work well for all systems, in part because different types of signal overlap in various characteristics, creating ambiguous signal conditioning situations.

SUMMARY OF THE INVENTION

In one aspect, the invention is directed to a method of optimizing picture quality of a video signal, including: displaying a user menu having a plurality of choices of video labels; receiving a choice of video label from the plurality via an input from a user; translating the video label into a label code; receiving at least a first video processing parameter from a look-up table corresponding to the label code; and configuring a video processor according to the first video processing parameter.

The method may further include: displaying a user menu having a plurality of video inputs, each video input having associated therewith a list of choices of video labels; and receiving for each video input a choice of video label from the list. The method may further include: receiving a video signal and analyzing the signal format; displaying a user menu having a plurality of choices of content types; receiving a choice of content type from the plurality via an input front a user; receiving at least a second video processing parameter from a look-up table corresponding to the received content type and the analyzed signal format; and configuring a video processor according to the second video processing parameter. The content type may be selected from the group consisting of: vivid, standard, movie, and professional. The signal format may be selected from the group consisting of: 480*i*, 480*p*, 720*p*, and 1080*i*. The method may further comprise displaying a video signal output from the configured video processor. The video inputs and video labels may be selected from the group of: DVD, VCR, TV tuner, composite video, component video, hard disk, cable, set-top box, 8 mm, game system, mpeg, VCD, HDTV, digital TV, web device, satellite, LD (laserdisc), other such systems, and combinations of these. If the video label is VCR, the video processing parameter may include conditioning a video signal that has high noise and low frequency response. If the video label is DVD, the video processing parameter may include conditioning a video signal that has low noise and a medium frequency response. If the video label is hard disk, the video processing parameter may include conditioning a video signal that has low noise and high frequency response.

In another aspect, the invention is directed towards a circuit for automatic picture conditioning, including: a microprocessor; a memory associated with the microprocessor, the memory for storing video parameters associated with video processing; a video input selector coupled to a plurality of video inputs, the video input selector also coupled to the microprocessor to receive a choice of video inputs therefrom; and a video processor connected to the microprocessor for receiving video parameters therefrom, the video processor also coupled to the video input selector to receive a video signal therefrom and to condition the video signal using the video parameters.

The invention may further comprise a display device coupled to the video processor to display the conditioned video signal. The video inputs and video labels may be selected as described above.

In another aspect, the invention is directed towards a program, residing on a microprocessor-readable medium, for causing a circuit to display a user menu having a plurality of choices of video labels; receive a choice of video label from the plurality via an input from a user; translate the video label into a label code; receive at least a first video processing parameter from a look-up table corresponding to the label code; and configure a video processor according to the first video processing parameter.

Advantages will be apparent from the description that follows, including the figures and the claims.

DETAILED DESCRIPTION

Figure 1:
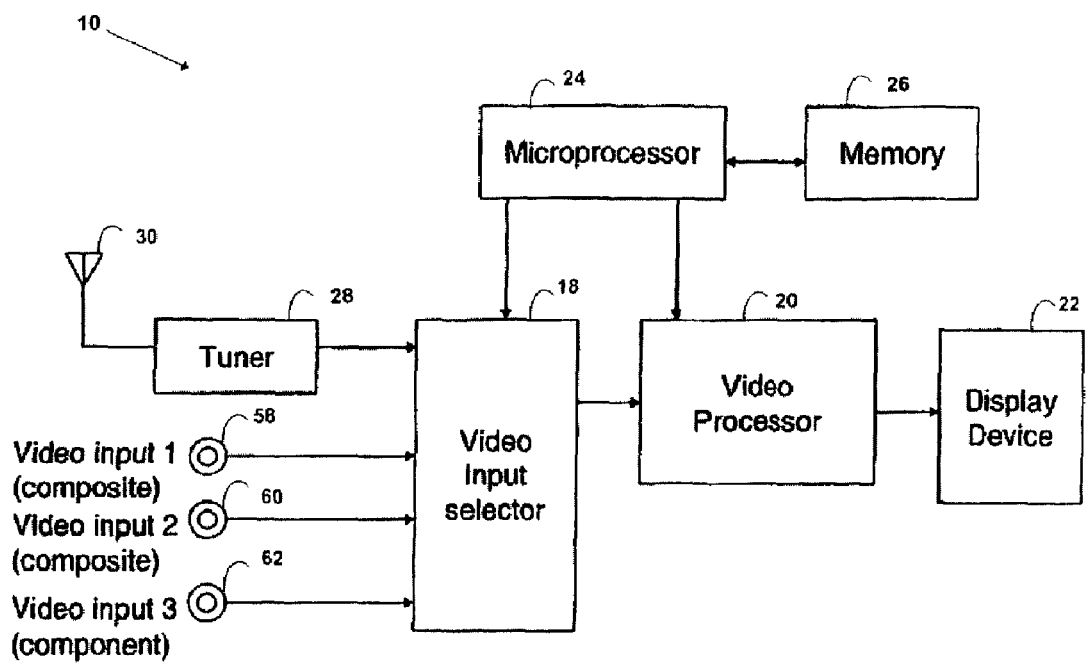
FIG. 1 is a schematic diagram of a system for automatic picture conditioning according to an embodiment of the present invention.

Referring to FIG. 1, a system 10 is shown for automatic picture conditioning according to an embodiment of the present invention. The system 10 may be entirely contained within and may be part of the circuitry of a television set. The system 10 has a plurality of video inputs 58, 60, and 62. While three inputs are shown, more and less are also envisioned by the present invention. In FIG. 1, video inputs 58 and 60 constitute "composite" video, while video input 62 constitutes "component video". This notation is for illustrative purposes only; other exemplary signal types for video inputs are described below. Examples of composite video include VCR signals output by RCA connectors; and examples of component video include DVD. A further video input may be from a TV tuner 28 coupled to an antenna 30.

The video inputs 58, 60, and 62 are connected to a video input selector 18 which is a circuit or chip that allows the signal from only one of the video inputs to pass through to a video processor 20 upon command of a microprocessor 24. The microprocessor 24 also drives the video processor 20. In so doing, the microprocessor sets the value of a number of video processing parameters, explained in more detail below, within the video processor 20 such that the operation of the same is optimized for the expected signal characteristics of the chosen or commanded video input.

The parameters sent to the video processor 20 are those, or correspond to those, read out of a memory 26 accessible to the microprocessor 24. The memory 26 may be in the form of a look-up table or several look-up tables. Upon optimization of the operating parameters of the video processor 20, the signal, conditioned by the video processor 20 and chosen via the video input selector 18, is sent to a display device 22.

In one embodiment, the values within memory 26 are set by user input. In particular, the user employs an on-screen data entry system to enter various video input types that correspond to the various video inputs. For example, one embodiment may have eight video inputs 58, 60, and 62, and so on, up to a video input 64 and a video input 66. A user may have a DVD player connected to video input 58, a game system connected to video input 62, and a VCR connected to video input 64. The remainder of the video inputs then has no devices attached.

Figure 2:
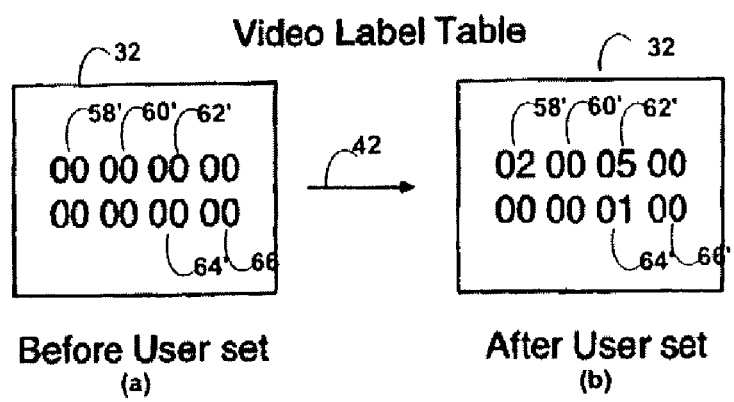
FIG. 2 is a before-and-after depiction of a table of video labels, prior to and after being set by a user.

Such an embodiment is represented in tabular form in FIGS. 2(*a*) and 2(*b*), where each video input corresponds to a two-digit number, termed a video label, in a 2×4 table. Each video label may have associated with it an identifier, such as "DVD", etc., which is more convenient for the user to read and manipulate than the raw video label number itself, and this identifier may be employed in the various user on-screen menus in which the user enters data.

The table of FIG. 2(*a*) is termed a video label table 32 and the same may be stored in the memory 26. The video label table 32 includes video labels such as a video label 58' for the video input 58, a video label 60' for the video input 60, a video label 62' for the video input 62, and so on, up to a video label 64' for the video input 64 and a video label 66' for the video input 66. Prior to user data entry, the video label table 32 has a default value of "00" in each video label as seen in FIG. 2(*a*).

After the step 42 of user data entry, the table is modified as shown in FIG. 2(*b*). As shown, the video labels no longer are all "00" but rather have finite values in video labels 58', 62', and 64'. The finite values so set are explained in more detail below.

In one embodiment, a user sets these values via a "Setup Menu", and in particular in a "Video Label" submenu. For example, the user may employ a joystick to highlight a video input to label, and then press a certain key to select the video input. The user may then employ the joystick to scroll through the choices of video labels or identifiers. Again, a certain key may be pressed when the desired video label identifier is highlighted. The video input is then set to the chosen video label. The procedure may be repeated for all the possible video inputs, and a "skip" video label identifier is available for those video inputs that are unused.

Various sets of video inputs may be pre-chosen and pre-set for a particular set of inputs. For example, video inputs one through four may be particularly useful for a VCR, a DVD, a receiver, a satellite system, a cable box, a Beta system, an 8 mm system, a digital TV system, a game system, a laser disk, or a web device, and these may in turn constitute the list of video labels that is scrolled when one of these video inputs is chosen in the user menu. These inputs may, e.g., have connectors that are most typical for these devices. Video inputs five through eight may correspondingly be useful for an overlapping or non-overlapping set of video inputs, such as a DVD, a satellite system, a cable box, a digital TV system, or a hard disk system system, and these may in turn constitute the list of video labels that is scrolled when one of these video inputs is chosen in the user menu. As above, these inputs may have connectors most pertinent to these devices.

Once each of the video inputs are associated with a desired video label, the system is ready to provide automatic picture conditioning.

Figure 3:
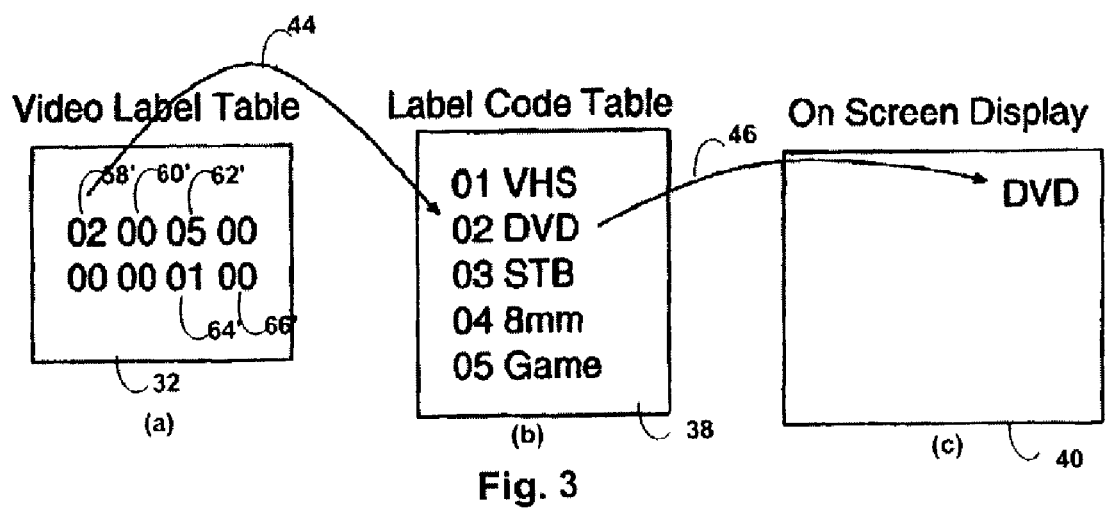
FIG. 3 is a data flow diagram showing how video labels in a table result in an on-screen display that employs automatic picture conditioning.

Referring to FIG. 3, a procedure is shown by which the user's choice of a video input enables automatic conditioning of the chosen signal. In use, a user chooses one of the video inputs set-up in the procedure of FIG. 2. For example, an on-screen menu allows the user to choose one of the video inputs, which on the menu may be conveniently identified by the identifier of the associated device. For example, and using the system of FIG. 2, a video set-up menu may give the user a choice of viewing either "DVD" (video input 58), "game system" (video input 62), or "VCR" (video input 64).

Of course, some users may prefer to choose a device using the numerical value of the video input to which the same is connected. For example, "Video 1" through "Video 8" may be used as identifiers.

The user then selects one of these by its identifier, e.g., the "DVD". As above, the selection may be via a joystick and key system, a remote control, or other methods as are known in the art.

The microprocessor 24, or a different circuit element, translates the identifier into the corresponding video input, such as the video input 58. The microprocessor 24 then examines the video label table 32, within the memory 26, to see what video label corresponds to the chosen video input. In the case of video input 58, a video label 58' of "02" is retrieved. The microprocessor 24 then consults (step 44) a label code table 38 (see FIG. 3(*b*)), which may also be stored within the memory 26, to determine what type of video source corresponds to the video label "02". Referring to FIG. 3(*b*), in this embodiment, the video label "02" corresponds to the label code "DVD", i.e., the video input 58 is connected to a DVD player.

The label code is then displayed (step 46) on the display device 22, and in particular within the on-screen display 40.

The microprocessor 24 uses the video code information to send optimized operating parameters, which may also be stored within the memory 26, to the video processor 20, which in turn employs the optimized parameters to send an optimized picture of the signal from the video input to the display device 22. Such optimized parameters for various devices are generally known.

In other embodiments of the invention, an additional level of signal conditioning may be employed. Various content types may be associated with particular signal conditioning settings. For example, content types such as movies, sports, and news generally have associated typical picture adjustments such as color, brightness, sharpness, etc. User choice of such content types may lead to additional signal conditioning and thus even higher picture quality.

Figure 4:
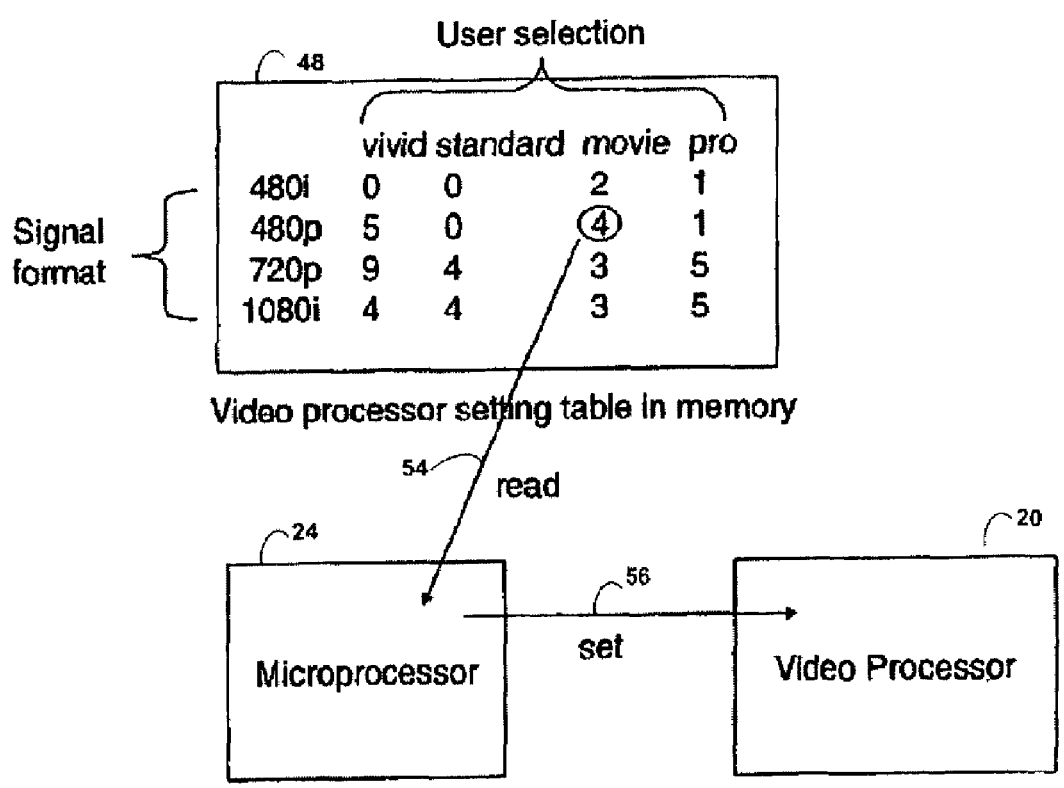
FIG. 4 is a data flow diagram showing how video processor settings in a table result in a video processor signal that employs automatic picture conditioning.

Referring to FIG. 4, a video processor setting table 48 is shown, which may be stored in memory 26. The columns in the table 48 correspond to a content type, such as "vivid" (for enhanced contrast and sharpness), "standard" (for normal viewing conditions), "movie" (for soft, film-like pictures), and "pro" (for a professional monitor-like appearance). The rows in the table 48 correspond to signal formats, such as 480*i*, 480*p*, 720*p*, and 1080*i*. These need not be set by the user but rather are conveniently detectable by the circuitry.

In use, the user chooses one of the available content types, also known as modes, e.g., "movie" as shown in FIG. 4. The circuitry determines the signal format, which is shown as 480*p* in FIG. 4. By using the table, a video processor setting of "4" is seen to be the appropriate video processor setting for this combination of content type and signal format. It will be noted that video processor setting "4" may represent a fairly simple set of parameters or a complicated set.

The video processor setting is read (step 54) by the microprocessor 24, which in turn sends (step 56) the appropriate video processor parameters to the video processor 20.

It will be understood that the above description has been with respect to particular embodiments of the invention. Numerous variations of the above embodiments may be known to one of ordinary skill in the art, and these variations are within the scope of the invention. For example, any of various known video inputs may be employed, including set-top boxes, etc. The various circuit elements, such as within FIG. 1, may be constructed on one or on several integrated circuits. The video processor parameters may be quite complicated or fairly simple. The label codes may be manually changed by the user at any time. Accordingly, the scope of the invention is to be limited only by the claims appended hereto, and equivalents thereof.

The invention claimed is:

1. A method of optimizing picture quality of a video signal, comprising:
   displaying a user menu having a plurality of choices of video labels;
   receiving a choice of video label from the plurality via an input from a user, wherein the choice of video label corresponds to a discrete video input of the video signal;
   translating the video label into a label code;
   receiving at least a first video processing parameter from a look-up table corresponding to the label code; and
   configuring a video processor by a microprocessor according to the first video processing parameter,
   wherein
   if the video label is VCR, the at least one video processing parameter includes conditioning a video signal that has high noise and low frequency response,
   if the video label is DVD, the at least one video processing parameter includes conditioning a video signal that has low noise and a medium frequency response,
   if the video label is hard disk, the at least one video processing parameter includes conditioning a video signal that has low noise and high frequency response, and
   if the video label is anything other than VCR, DVD and hard disk, then the at least one video processing parameter includes conditioning a video signal based upon its characteristics.

2. The method of claim 1, further comprising:
   displaying a user menu having a plurality of discrete video inputs, each discrete video input having associated therewith a list of choices of video labels; and
   receiving for each discrete video input a choice of video label from the list.

3. The method of claim 2, wherein the video inputs are selected from the group consisting of: DVD, VCR, TV tuner, composite video, component video, hard disk, cable, set-top box, 8 mm, game system, MPEG, VCD, HDTV, digital TV, satellite, and combinations thereof.

4. The method of claim 2, wherein the video labels are selected from the group consisting of: DVD, VCR, TV tuner, composite video, component video, hard disk, cable, set-top box, 8 mm, game system, MPEG, VCD, HDTV, digital TV, satellite, and combinations thereof.

5. The method of claim 1, further comprising:
   receiving a video signal and analyzing a signal format of said video signal;
   displaying a user menu having a plurality of choices of content types;
   receiving a choice of content type from the plurality via an input from a user;
   receiving at least a second video processing parameter from a look-up table corresponding to the received content type and the analyzed signal format; and
   configuring a video processor according to the second video processing parameter.

6. The method of claim 5, wherein the content type is selected from the group consisting of: vivid, standard, movie, and professional.

7. The method of claim 5, wherein the signal format is selected from the group consisting of: 480*i*, 480*p*, 720*p*, and 1080*i*.

8. The method of claim 1, further comprising displaying a video signal output from the configured video processor.

* * * * *